June 9, 1964     A. SERRA     3,136,719
LIQUID DEIONIZATION APPARATUS PERMITTING CONTINUOUS OPERATION
Filed June 1, 1961
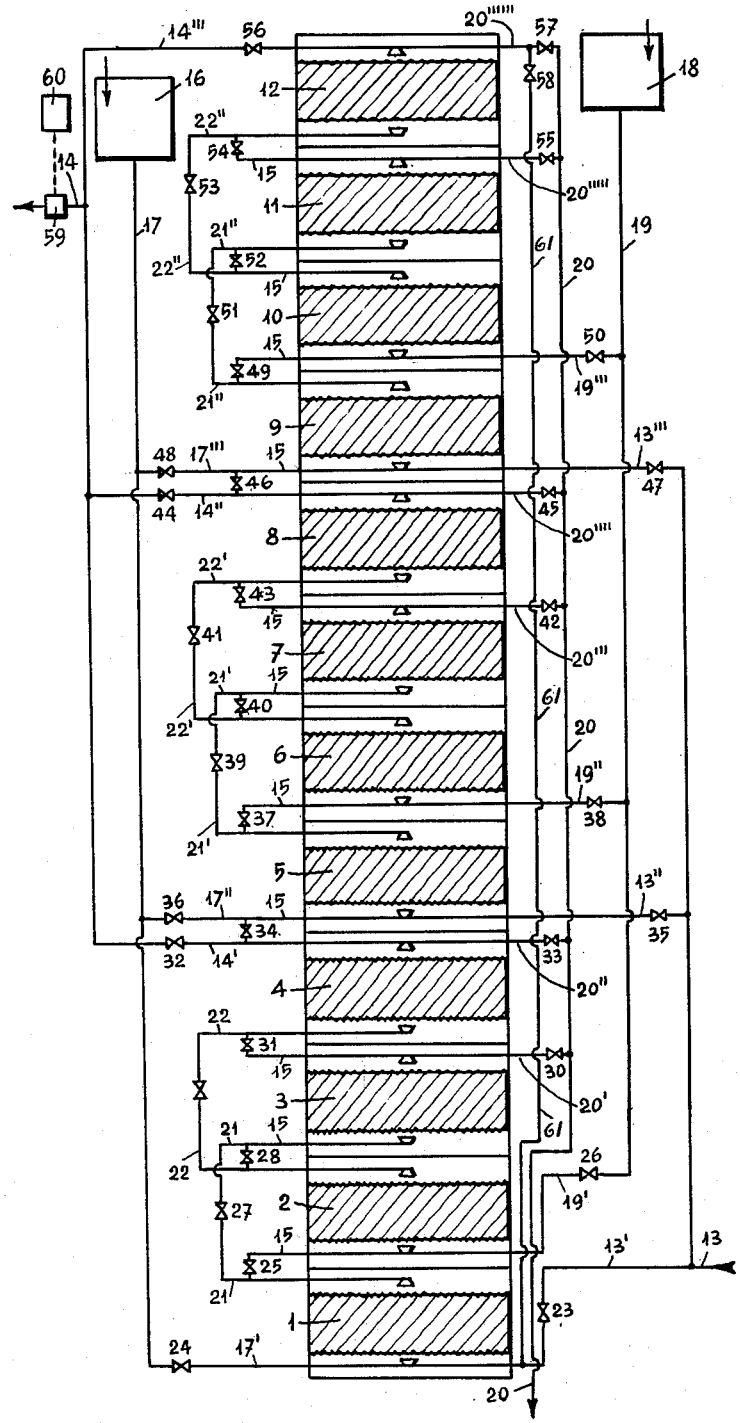
INVENTOR.
ANNA SERRA
BY William D. Carothers
HER ATTORNEY

United States Patent Office 3,136,719
Patented June 9, 1964

3,136,719
LIQUID DEIONIZATION APPARATUS PERMITTING CONTINUOUS OPERATION
Anna Serra, Via Assarotti 54, Genoa, Italy
Filed June 1, 1961, Ser. No. 114,207
Claims priority, application Italy June 10, 1960
3 Claims. (Cl. 210—190)

Methods of deionization through mixed layer ion exchange of rosins, that is with a mixture of cationic and anionic rosins, are well known. The regeneration methods of mixed resins provide the separation of the resins by decantation in a current of upward directed water, and the successive regeneration of the parted layers of cationic and anionic resins.

The object of the present invention is to provide a method and an installation for the deionization by means of ion exchange resisns, working continuously with alternate layers of cationic and anionic resins, so as to obtain a very high deionization without using mixed resins and therefore without being obliged to accomplish a separation of the resins for their regeneration.

The deionization method by means of ion exchange resins according to the present invention is characterized in that the cationic and anionic resisns are separated in groups of successive and alternate layers.

The above mentioned deionization method is further characterized in that:

The deionization is effected continuously and the resins are passed through from the bottom upwards;

The regeneration of the resin layers is accomplished in a cyclic way on at least one third of the layers of the installation;

The regeneration of one third of the layers and their subsequent washing, which are accomplished from the bottom upwardly, occur at the same time as another third of the layers end their exchange power and the last third reaches about one half of its exchange power;

The liquid or solution to be deionized passes first through a series of resin layers exhausted to about 50% average, starting from the more exhausted layer, and then passes through the series of layers of regenerated resins.

The installation to realize the above method is characterized in that it comprises:

A set of at least twelve layers, or compartments, of cationic and anionic ion exchange resins, arranged in alternate positions, and still passed through from the bottom upwards;

A net of pipe lines to lead from the bottom upwards, through the groups of layers or compartments of resins: either the liquid or solution to be deionized, or the acid regenerant for cationic resins, the basic regenerant for anionic resins and the washing water to remove the excess of regenerants;

A set of valves, actionable in any desired way, to cyclically include the regenerated layers and to exclude the exhausted ones, in order to utilize two thirds of the installation to obtain the deionization of the liquid or solution, while the other third is regenerated and washed.

An embodiment of the present invention concerning the deionization of raw water is shown schematically, and by way of example only in the accompanying drawings. With reference to the figure, numerals 1, 3, 5, 7, 9 and 11 denote layers of cationic resins and numerals 2, 4, 6, 8, 10 and 12 layers of anionic resins. Numeral 13 denotes the inlet pipe line for the raw water into the installation and 13', 13", 13''' three branchings communicating with the lower portions of layers 1, 5 and 9 respectively; 14 the outlet pipe line of the deionized water and 14', 14", 14''' junctions communicating with the upper portions of layers 4, 8 and 12 respectively; 15 the portions of pipe lines suitable to connect the different resins layers to one another; 16 the feeding container of the acid regenerant. Numeral 17 denotes the inlet pipe line of the acid regenerant for the regeneration of the cationic layers and 17', 17", 17''' three branchings communicating with the lower portions of elements 1, 5 and 9 respectively; 18 the feeding container for the alkaline regenerant; 19 the inlet pipe line for the alkaline regenerant for the regeneration of the anionic layers and 19', 19", 19''' three branchings communicating with the lower portions of layers 2, 6 and 10 respectively. Numeral 20 denotes a discharge pipe line and 20', 20", 20''', 20'''', 20''''', 20'''''' junctions communicating with the upper portions of layers 3, 4, 7, 8, 11 and 12 respectively; 21, 21', 21" pipe lines connecting to each other the cationic layers 1–3, 5–7, 9–11; 22, 22', 22" pipe lines connecting to each other the anionic layers 2–4, 6–8, 10–12. Numeral 23 denotes an intercepting valve, disposed on branch 13' of the inlet pipe line, for the raw water conveyed under the cationic layer 1; 24 denotes an intercepting valve, disposed on branch 17' of the inlet pipe line of the acid conveyed under the cationic layer 1; 25 a valve disposed on the pipe lines connecting the upper portion of layer 1 to the lower portion of layer 2; 26 a valve disposed on branch 19' of the piping of the alkaline regenerant. Numeral 27 denotes a valve disposed on piping 21 connecting the cationic layers 1 and 3; 28 denotes a valve disposed on the pipings connecting the upper portion of layer 2 to the lower portion of layer 3; 29 a valve disposed on piping 22 connecting the anionic layers 2 and 4; 30 a valve disposed on junction 20' to the discharge pipe 20; 31 a valve disposed on the pipings connecting the upper portion of layer 3 to the lower portion of layer 4; 32 a valve disposed on junction 14' to piping 14 for the outlet of the deionized water; 33 a valve disposed on junction 20" to the discharge pipe 20. Numeral 34 denotes a valve arranged on the pipings connecting the upper portion of layer 4 to the lower portion of layer 5; 35 and 47 denote two valves disposed on branches 13" and 13''' of the inlet piping 13 for the raw water; 36 and 48 two valves disposed on branches 17" and 17''' of the inlet piping 17 of the acid regenerant; 37, 40, 43, 46, 49 and 54, denote valves disposed respectively on the pipings connecting to each other the upper portions of the various layers to the lower portions of the adjacent layers, 58 is a valve disposed on the piping 61 connecting the upper part of layer 12 with the lower part of layer 1; 38 and 50 are valves disposed on branches 19" and 19''' of the piping 19 for the inlet of the alkalyn regenerant; 39 and 51 valves disposed on pipings 21' and 21" connecting to each other the cationic layers 5–7 and 9–11; 41 and 53 valves disposed on pipings 22' and 22" connecting to each other the anionic layers 6–8 and 10–12. Numerals 42, 45, 55, 57 denote valves disposed on junctions 20''', 20'''', 20''''', 20'''''' to the discharge conduit 20; 44 and 56 denote valves disposed on junctions 14" and 14''' to the outlet piping 14 for the deionized water; 59 a cell provided with electrodes for metering the chemical resistance of the deionized water; 60 denotes an instrument for metering the specific resistance of the deionized water passing through the cell.

The above-described installation comprising twelve layers of cationic and anionic resins arranged in alternate positions, and supposing that the first eight layers of resins are used for deionizing the raw water and the last four have a regeneration function, works as follows: valves 23, 25, 28, 31, 34, 37, 40, 43 and 44 are opened and the raw water coming from piping 13 and branch 13' reaches valve 23 which is open and allows the passing of the water which is conveyed under the cationic layer 1. The raw water upwardly directed passes through the cationic resin layer 1, through valve 25 in the anionic resin layer 2, through valve 28 in the cationic resin layer 3 and so on in an upward current until passing through the anionic resin layer 8. The deionized water arrived at the upper portion of layer 8 exits through junction 14″ and, passing through valve 44, discharges into piping 14 passing through cell 59 connected to the metering instrument 60 for measuring the chemical resistance to control the purity.

The raw water, on passing through the resin layers, exhausts them starting at the bottom with those first passed through. After a certain period of time the first four layers, 1 to 4, will be exhausted. Contemporaneously to said exhaustion, the last four layers, 9 to 12 will have been regenerated by the following method.

To regenerate layers 9 and 11, 10 and 12 valves 48, 51, 55 are opened for the acid regenerant and valves 50, 53, 57 for the alkaline regenerant.

The acid regenerant, for instance sulphuric acid, through piping 17 reaches valve 48 and through branch 17‴ arrives under the cationic layer 9 passing then through it in an upward current. When the acid has arrived above the cationic layer 9 is led through piping 21″ and valve 51 under the cationic layer 11, passes through it in an upward current and then goes through junction 20‴″ and valve 55 into the discharge pipe line 20. At the same time the alkaline regenerant, for instance sodium hydroxide, through piping 19 reaches valve 50 and through branch 19‴ arrives under layer 10 passing through it in an upward current. When the alkaline regenerant has arrived above the resin layer 10 it is led, through piping 22″ and valve 53, into the lower portion of the anionic layer 12, passes through it in an upward current and then goes through junction 20‴″ and valve 57 into the discharge pipe 20.

In order to remove the excess of the regenerant, the cationic resins are washed in the following way: valves 47, 51, 55 are opened. The raw water enters from valve 47 through branch 13‴, arrives under the cationic layer 9, passes through it from the bottom upwards, and through piping 21″ and valve 51 reaches the cationic layer 11, passes through it in an upward current and goes then, through junctions 20‴″ and valve 55, into the discharge conduit 20.

In order to remove the excess of regenerant the anionic resins are washed in the following way: valves 47, 49, 53, 57 are opened (the washing water is filtered through a cationic layer before contacting the anionic resin, to prevent the calcium carbonates from precipitating in the anionic resin). The raw water enters from valve 47 through branch 13‴ the bottom of the cationic layer 9, passes through it upwardly and reaches, through valve 49 and piping 15, the lower portion of the anionic layer 10, passes through it in an upward current and, through piping 22″ and valve 53, reaches the lower portion of the anionic layer 12, passes through it upwardly directed and then through junction 20‴″ and valve 57 into the discharge pipe line 20.

To exclude the exhausted layers 1 to 4 and include the regenerated ones 9 to 12 the method herebelow described is followed: valves 35, 37, 40, 43, 46, 49, 52, 54, 56 are opened.

From valve 35 through branch 13″ the raw water enters from below the cationic layer 5, passes through layers 5, 6, 7, 8, 9, 10, 11, 12 and goes out from valve 56 and junction 14‴ as deionized water. At the same time layers 1 to 4 are regenerated as above described, that is valves 24, 27, 30 are opened to send the acid regenerant through the two cationic resin layers 1 and 3 and discharge it from 20′ into the discharge piping 20; simultaneously valves 26, 29 and 33 are opened to lead the alkaline regenerant through the two anionic resin layers 2 and 4 and discharge it from 20″ into the discharge pipe 20.

When the layers of cationic and anionic resins have been regenerated, the cationic layers are washed by feeding raw water through branch 13′, valve 23, layer 1, valve 27, the cationic layer 3 and valve 30 leading to the discharge conduit 20. Finally the anionic layers are washed as afore described, that is by feeding raw water through branch 13′, valve 23, the cationic layer 1, valve 25, the anionic layer 2, valve 29, the anionic layer 4 and valve 33 leading to the discharge piping 20.

By keeping on, in a cyclic manner, opening and closing the valves to displace the course of the raw water and the courses of the two regenerants of the resins and of the washing waters, a continuous production of deionized water of very high purity may be obtained, and at the same time a cyclic regeneration of the resin is achieved.

By operating with an upward current, the necessity of washing the resin with countercurrent to homogenize the resin layer is avoided, and further it is unnecessary to provide a hollow space above the resin layer to allow its expansion during the washing with an upward current, this resulting in a remarkable saving of equipment and reduction of size.

Although for descriptive reasons the present invention has been described in connection with the above stated deionization of raw water, the invention may be used to deionize any type of liquid, or solution, by merely adding to the described installation an inlet pipe for the liquid solution to be deionized. Further, many modifications and changes may be made in embodying the installation as for example either the number of the resin layers or the arrangement and number of the pipes and valves may be changed and increased because in the illustrated example these have been reduced to the minimum. All such modifications and changes however, are contemplated based on the main concept of the invention as embodied in the following claims.

What I claim is:

1. An apparatus for liquid deionization by means of ion exchange resins comprising a plurality of layers of cation and anion active materials disposed in alternate layers vertically above one another in a single column, each said layer being disposed in a separate cell, pipe means connecting said cells for feeding a liquid through said cells in series, an outlet pipe for discharge of deionized liquid, valve means in said pipe means coupling the cells into at least three independent groups each containing a plurality of cells and for disconnecting any selected group of cells and directing the liquid to be ionized around the selected group so that the cells of that group may be simultaneously subjected to regeneration, a source of acid regenerant and a source of alkaline regenerant, and conduit means including valves connecting said sources with the cells of said selected group containing cation and anion active materials respectively.

2. The apparatus according to claim 1 wherein said pipe and conduit means are so connected and arranged as to feed the liquid to be deionized as well as the acid and alkaline regenerants upwardly through the stacked cells of said column.

3. The apparatus according to claim 1 wherein said conduit means include pipes and valves connected to said cells for passage of rinse water at the conclusion of a regeneration period.

References Cited in the file of this patent

UNITED STATES PATENTS

| | | |
|---|---|---|
| 2,458,115 | Swenson | Jan. 4, 1949 |
| 2,763,607 | Staverman | Sept. 18, 1956 |